US012656864B2

(12) United States Patent
Kang et al.

(10) Patent No.: US 12,656,864 B2
(45) Date of Patent: Jun. 16, 2026

(54) METHOD FOR DETERMINING USER'S GAZE AND ELECTRONIC DEVICE THEREFOR

(71) Applicant: SAMSUNG ELECTRONICS CO., LTD., Suwon-si (KR)

(72) Inventors: Jinmo Kang, Suwon-si (KR); Sungoh Kim, Suwon-si (KR); Jihyun Kim, Suwon-si (KR); Hyungsok Yeo, Suwon-si (KR); Donghyun Yeom, Suwon-si (KR); Gunhee Lee, Suwon-si (KR); Sanghun Lee, Suwon-si (KR); Bokun Choi, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 19/007,470

(22) Filed: Dec. 31, 2024

(65) Prior Publication Data

US 2025/0130638 A1     Apr. 24, 2025

Related U.S. Application Data

(63) Continuation of application No. PCT/KR2023/011741, filed on Aug. 9, 2023.

(30) Foreign Application Priority Data

Aug. 10, 2022     (KR) ........................ 10-2022-0099900
Sep. 27, 2022     (KR) ........................ 10-2022-0122462

(51) Int. Cl.
G06F 3/01       (2006.01)
G06T 7/73       (2017.01)
H04N 23/71      (2023.01)

(52) U.S. Cl.
CPC .............. *G06F 3/013* (2013.01); *G06F 3/015* (2013.01); *G06T 7/74* (2017.01); *H04N 23/71* (2023.01); *G06T 2207/30201* (2013.01)

(58) Field of Classification Search
CPC . G06F 3/013; G06F 3/015; G06F 3/00; G06F 3/01; G06T 7/74;
(Continued)

(56) References Cited

U.S. PATENT DOCUMENTS 8,885,882 B1 * 11/2014 Yin ........................ G06V 40/19
                                                                   382/103
8,942,434 B1 *  1/2015 Karakotsios ............. A61B 3/14
                                                                   382/117
(Continued)

FOREIGN PATENT DOCUMENTS

CN       110147163 A     8/2019
CN       110807427 A     2/2020
(Continued)

OTHER PUBLICATIONS

I. Rigas, H. Raffle and O. V. Komogortsev, "Hybrid PS-V Technique: A Novel Sensor Fusion Approach for Fast Mobile Eye-Tracking With Sensor-Shift Aware Correction," in IEEE Sensors Journal, vol. 17, No. 24, pp. 8356-8366, Dec. 15, 15, 2017, doi: 10.1109/JSEN.2017.2762704. (Year: 2017).*
(Continued)

*Primary Examiner* — Bryan Earles
(74) *Attorney, Agent, or Firm* — CANTOR COLBURN LLP

(57) ABSTRACT

An electronic device includes a sensor and a processor. The processor identifies whether a characteristic value measured from the sensor while acquiring a first image including a user's eye satisfies a designated condition. When the characteristic value satisfies the designated condition, the pro-
(Continued)

cessor identifies a pupil position in the first image using a first scheme of extracting a feature point, based on matching with a designated pattern, acquires a second image including the user's eye, and identifies an amount of change in the second image with reference to the first image. When the amount of change in the second image is greater than or equal to a designated level, the processor calculates accuracy of the first scheme, and according to the calculated accuracy, identifies a pupil position in the second image using the first scheme, or a second scheme of extracting a feature point based on a trained network.

17 Claims, 8 Drawing Sheets

(58) Field of Classification Search
CPC . G06T 2207/30201; G06T 2207/20081; G06T 2207/20084; G06T 7/246; H04N 23/71; A61B 5/398; G01J 1/02; G06V 10/56; G06V 10/62; G06V 40/18; G06V 40/19
See application file for complete search history.

(56) References Cited

U.S. PATENT DOCUMENTS

| | | | |
|---|---|---|---|
| 10,043,281 B2 | 8/2018 | Mallinson et al. | |
| 10,310,597 B2 | 6/2019 | Biedert et al. | |
| 11,003,936 B2 | 5/2021 | Åberg et al. | |
| 11,294,462 B2 | 4/2022 | Selker et al. | |
| 11,393,251 B2 | 7/2022 | Tonsen et al. | |
| 12,002,290 B2 * | 6/2024 | Hinton | H04N 23/64 |
| 2015/0061995 A1 | 3/2015 | Gustafsson et al. | |
| 2015/0186722 A1 | 7/2015 | Cho et al. | |
| 2016/0202757 A1 * | 7/2016 | Miao | G06V 40/193 |
| | | | 348/78 |
| 2018/0299953 A1 * | 10/2018 | Selker | G06T 19/006 |
| 2020/0143547 A1 | 5/2020 | Heo et al. | |
| 2021/0042520 A1 * | 2/2021 | Molin | G06V 40/18 |
| 2022/0100268 A1 | 3/2022 | Weinberg et al. | |
| 2022/0155860 A1 * | 5/2022 | Tzvieli | A61B 5/02427 |
| 2023/0168735 A1 * | 6/2023 | Chugh | G06F 3/012 |
| | | | 382/103 |
| 2023/0380684 A1 * | 11/2023 | Chappell | G06F 3/0482 |

FOREIGN PATENT DOCUMENTS

| | | | | | |
|---|---|---|---|---|---|
| CN | 113190117 A | | 7/2021 | | |
| CN | 113688733 A | | 11/2021 | | |
| EP | 4167199 A1 | * | 4/2023 | | G06V 40/18 |
| JP | 2019028640 A | | 2/2019 | | |
| KR | 20150075906 A | | 7/2015 | | |
| KR | 20200052068 A | | 5/2020 | | |
| WO | 2013117727 A1 | | 8/2013 | | |
| WO | 2021007087 A1 | | 1/2021 | | |

OTHER PUBLICATIONS

W. Fuhl, Y. Rong and E. Kasneci, "Fully Convolutional Neural Networks for Raw Eye Tracking Data Segmentation, Generation, and Reconstruction," 2020 25th International Conference on Pattern Recognition (ICPR), Milan, Italy, 2021, pp. 142-149, doi: 10.1109/ ICPR48806.2021.9413268. (Year: 2021).*

* cited by examiner

METHOD FOR DETERMINING USER'S GAZE AND ELECTRONIC DEVICE THEREFOR

TECHNICAL FIELD

Various embodiments of the disclosure relate to a method of determining a gaze, based on user's eye tracking.

BACKGROUND ART

Augmented Reality (AR) technologies have recently been utilized in various industrial fields. AR is a technology which synthesizes a virtual object or information in a real environment space existing in the real world and displays it so that it looks as if it existed originally. For example, electronic devices may be implemented to be worn on a user's face or head portion, and may provide AR content so that the user is able to see real scenes and virtual images together through a see-through display in front of user's eyes.

An eye tracking function for detecting a user's gaze may be performed to provide the AR content. Eye tracking is a technology which detects a pupil movement to determine exactly where the user's gaze is staying, and may be utilized to analyze a pattern of processing information through a path of the gaze or a time of staying in a center of a viewing angle.

DISCLOSURE OF INVENTION

Technical Problem

Eye tracking may include a feature extraction operation for identifying a pupil position in an image including an eye, an eye model estimation operation for estimating parameters of a 3-Dimensional (3D) eye model, based on an extracted feature point, and a user gaze calibration operation for calibrating gaze data by reflecting an eye characteristic of each individual user. Herein, feature extraction may be performed by using a fixed method, i.e., a classic method which utilizes a computer vision technology or a deep learning method which extracts pupil information by constructing a neural network model. The classic method has an advantage in that a computational amount is small, but accuracy may decrease in a specific situation where variables occur for an external environment or a user. On the other hand, the deep learning method may increase the computational amount, instead of maintaining the accuracy even in the specific situation.

Advantages acquired in the disclosure are not limited to the aforementioned advantages, and other advantages not mentioned herein may be clearly understood by those skilled in the art to which the disclosure pertains from the following descriptions.

Solution to Problem

An electronic device according to an embodiment of the disclosure may include a sensor module including one or more sensors, at least one processor operatively coupled to the sensor module, and a memory operatively coupled to the at least one processor. The memory may store instructions causing, when executed, the at least one processor to identify whether a characteristic value measured from the one or more sensors while acquiring a first image including a user's eye satisfies a designated condition, when the characteristic value satisfies the designated condition, identify a pupil position in the first image by using a first scheme of extracting a feature point, based on matching with a designated pattern, acquire a second image including the user's eye, identify an amount of change in the second image with reference to the first image, when the amount of change in the second image is greater than or equal to a designated level, calculate accuracy of the first scheme, and according to the calculated accuracy, identify a pupil position in the second image by using the first scheme or a second scheme of extracting a feature point, based on a trained network.

A method of operating an electronic device according to an embodiment of the disclosure may include identifying whether a characteristic value measured from one or more sensors while acquiring a first image including a user's eye satisfies a designated condition, when the characteristic value satisfies the designated condition, identifying a pupil position in the first image by using a first scheme of extracting a feature point, based on matching with a designated pattern, acquiring a second image including the user's eye, identifying an amount of change in the second image with reference to the first image, when the amount of change in the second image is greater than or equal to a designated level, calculating accuracy of the first scheme, and according to the calculated accuracy, identifying a pupil position in the second image by using the first scheme or a second scheme of extracting a feature point, based on a trained network.

BRIEF DESCRIPTION OF DRAWINGS

With regard to the description of the drawings, the same or similar reference numerals may be used to refer to the same or similar elements.

MODE FOR CARRYING OUT THE INVENTION

Hereinafter, various embodiments of the disclosure are described with reference to the accompanying drawings. However, it should be appreciated that this is not intended to limit the technological features set forth herein to particular embodiments and include various modifications, equivalents, and/or alternatives for an embodiment of the disclosure.

Figure 1:
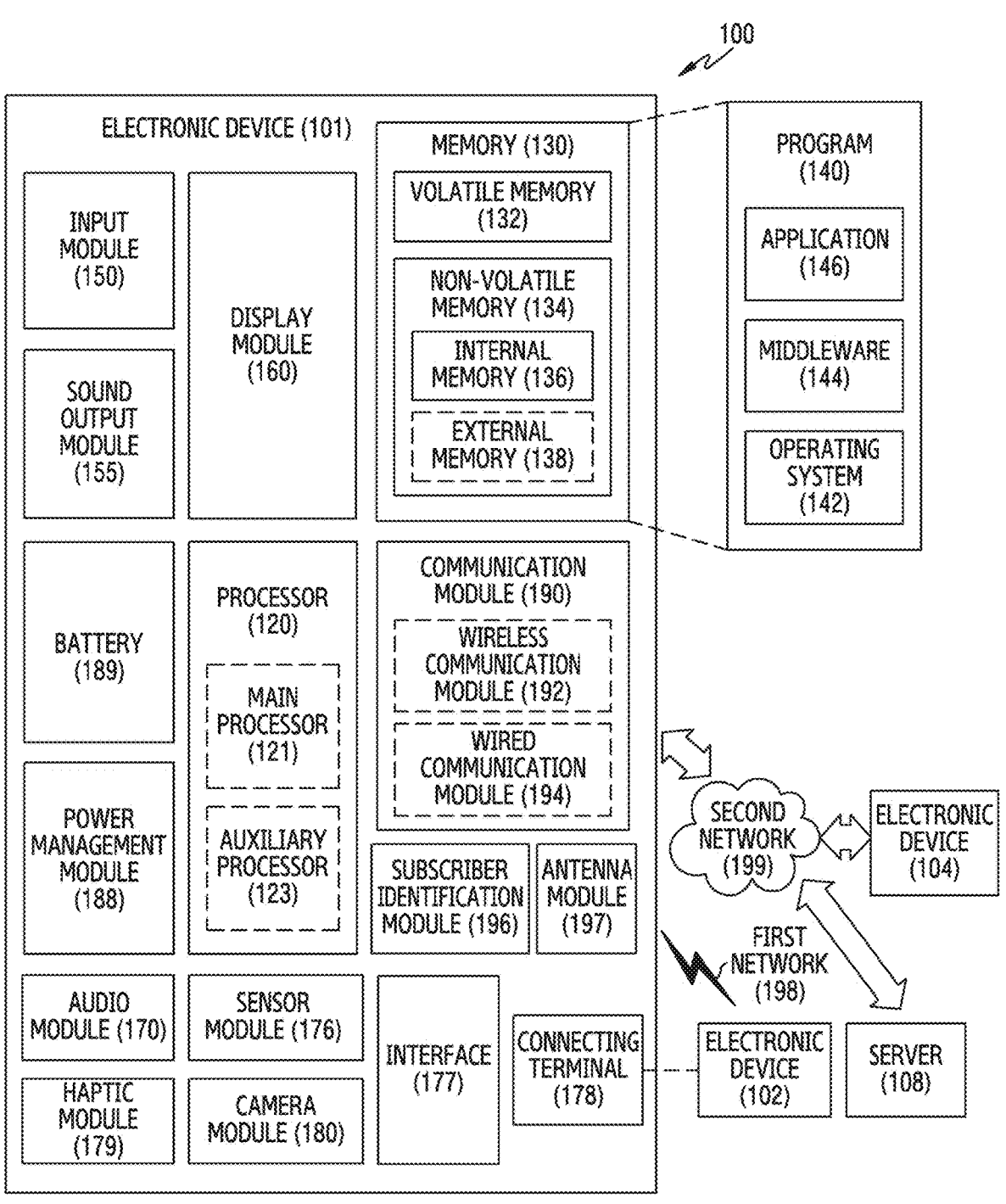
FIG. 1 is a block diagram of an electronic device in a network environment according to an embodiment.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mm Wave antenna module. According to an embodiment, the mm Wave antenna module may include a printed circuit board, a RFIC disposed on a first surface (e.g., the bottom surface) of the printed circuit board, or adjacent to the first surface and capable of supporting a designated high-frequency band (e.g., the mm Wave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
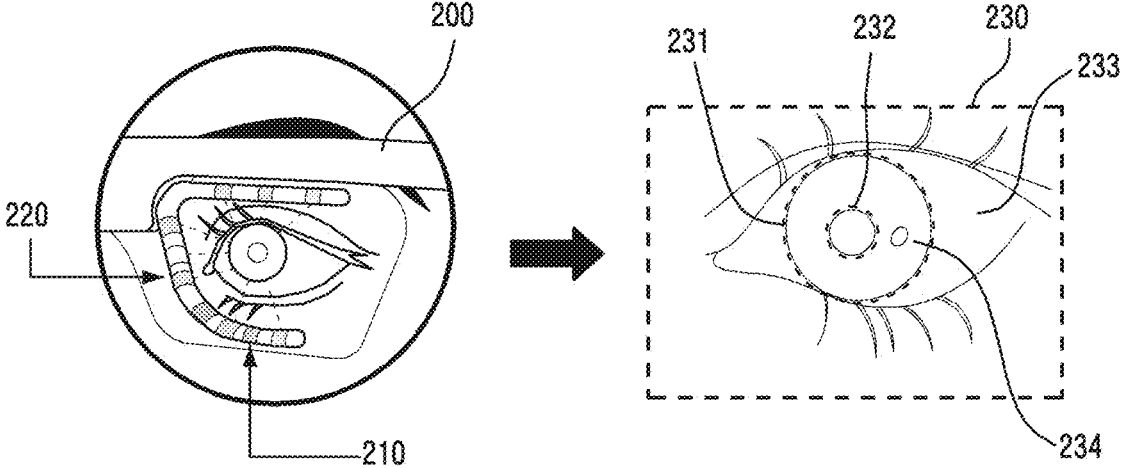
FIG. 2 illustrates a method of acquiring an image for eye tracking according to an embodiment.

FIG. 2 illustrates a method of acquiring an image for eye tracking according to an embodiment.

Referring to FIG. 2, the eye tracking may be performed while a user wears Augmented Reality (AR) glasses 200 manufactured in the form of glasses on a face portion. The AR glasses 200 may include a camera 210 for tracking a user's gaze and one or more Light Emitting Diodes (LEDs) 220 which shine light toward user's eyes. According to various embodiments, the camera 210 may be an Infrared Ray (IR) camera which produces an image by using light of an IR wavelength, and the LED 220 may be an IR LED which emits the light of the IR wavelength.

In an embodiment, the AR glasses 200 may acquire an image 230 of a user's eye captured by the camera 210 while worn on the user's face portion. According to various embodiments, the AR glasses 200 may obtain an image of both eyes captured by the camera 210, or may acquire each of images of left and right eyes captured by the two or more cameras 210 disposed for the left eye and right eye.

In an embodiment, the AR glasses 200 may identify from the eye image 230 a position of an iris 231, a pupil 232, a sclera 233, or a glint portion 234 in which reflection occurs by the LED 220. According to various embodiments, the eye image 230 may be analyzed in the AR glasses 200, or may be analyzed by a smartphone-type electronic device coupled wiredly or wirelessly to the AR glasses 200. A result of analyzing the eye image 230 may be utilized in user's gaze tracking.

Figure 3:
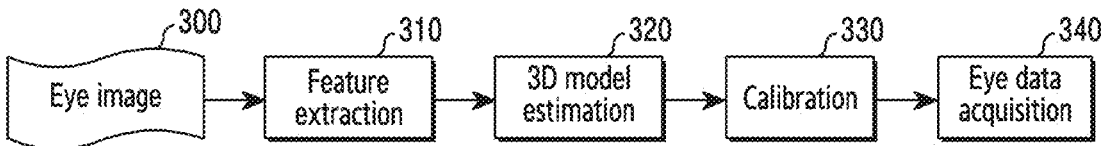
FIG. 3 illustrates an eye tracking algorithm according to a comparative example.

FIG. 3 illustrates an eye tracking algorithm according to a comparative example. In the comparative example, AR glasses (e.g., the AR glasses 200 of FIG. 2) may perform eye tracking, based on an image including at least one of user's left and right eyes. In the comparative example of FIG. 3, functions described as being performed by the AR glasses

200 may be performed by a smartphone-type electronic device wiredly or wirelessly coupled to the AR glasses 200.

Referring to FIG. 3, the AR glasses 200 may acquire an eye image 300 from a camera (e.g., the camera 210 of FIG. 2). For example, the eye image 300 may be an image captured by an IR camera. The AR glasses 200 may perform feature extraction (see 310) to identify a pupil position in the eye image 300. According to various embodiments, the feature extraction for the eye image 300 may be performed by using a classical method such as FIG. 4 or a deep learning method such as FIG. 5.

Figure 4:
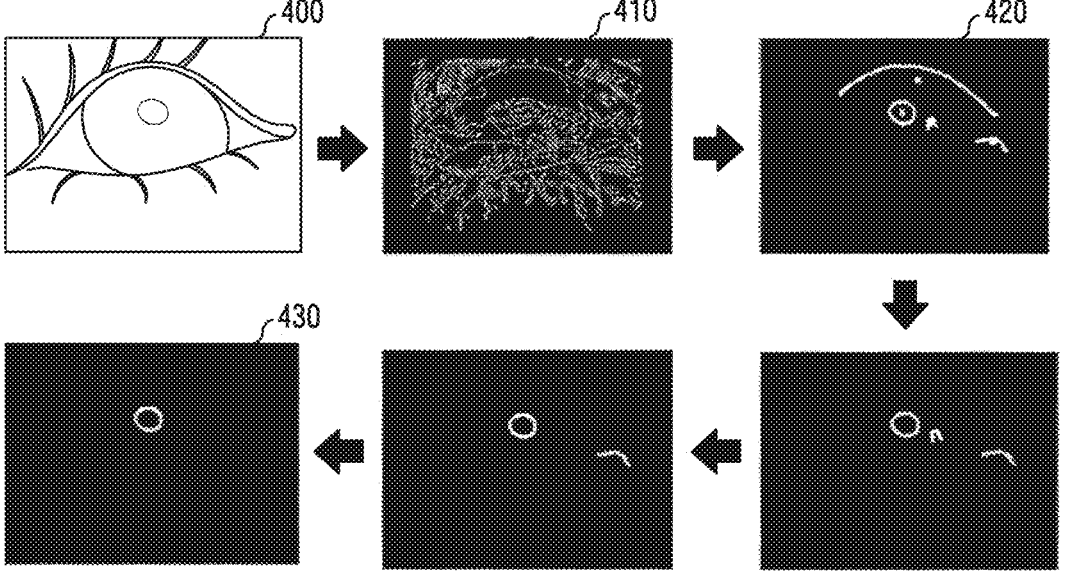
FIG. 4 illustrates feature extraction using a classic method, according to an embodiment.

FIG. 4 illustrates feature extraction using a classic method, according to an embodiment. The classic method may be performed to detect edges from an eye image 400 by using a computer vision technology, and to extract a feature point corresponding to a pupil area through ellipse fitting for the detected edges. For example, the AR glasses 200 may detect edges 410 for the eye image 400 acquired using an IR camera (e.g., the camera 210 of FIG. 2), and may extract elliptical edges 420 among the detected edges. The AR glasses 200 may select an edge 430 having the most similar shape and size of the pupil among the extracted elliptical edges as the feature point corresponding to the pupil area. As another example, the electronic device may detect edges of the eye image 400 received from the AR glasses 200 and then may perform ellipse fitting to extract the feature point corresponding to the pupil area.

Figure 5:
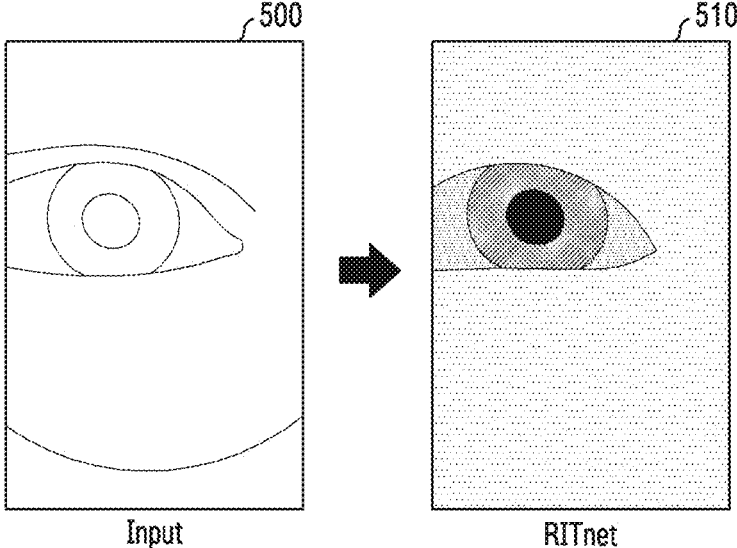
FIG. 5 illustrates feature extraction using a deep learning method, according to an embodiment.

FIG. 5 illustrates feature extraction using a deep learning method, according to an embodiment. The deep learning method may be performed to extract a feature point corresponding to a pupil area from an eye image 500, based on a neural network model. For example, the AR glasses 200 may segment the eye image 500 acquired using an IR camera (e.g., the camera 210 of FIG. 2) on a pixel basis, and may detect a pupil pattern 510 from the segmented pixels by using a trained neural network model to extract the feature point corresponding to the pupil area. As another example, the electronic device may segment the eye image 500 received from the AR glasses 200, and then may extract the feature point corresponding to the pupil area by using the learn network model.

Returning to FIG. 3, in a comparative example, the AR glasses 200 may extract a feature point corresponding to a pupil position in the eye image 300 by using a fixed method, i.e., the classic method described in FIG. 4 and the deep learning method described in FIG. 5. When the feature point is extracted using the classic method, since a computational amount is relatively small, there is a little burden of power consumption or heat generation, whereas accuracy may deteriorate in a situation where variables occur for an external environment or a user. For example, when a surrounding environment of a user wearing the AR glasses 200 changes (e.g., a location movement, a change in a lighting environment, or a change in illumination), accuracy of the feature point extracted by the classic method may decrease. As another example, when a user characteristic changes such as when a user wears contact lenses or puts on eye makeup or when an eye shape is different from usual because of eye disease, accuracy of feature extraction based on the classic method may decrease. When the feature extraction is performed using the deep learning method, the accuracy may be maintained even in the situation where the variables occur for the external environment or the user, but the burden of power consumption or heat generation may increase due to a relatively large computational amount.

In a comparative example, the AR glasses 200 may perform 3D model estimation (see 320) to estimate parameters of a 3D eye model by using a feature point corresponding to a pupil position extracted from the eye image 300. The AR glasses 200 may estimate an eye position, a point of gaze, or a viewing angle by modeling a user's eye (or pupil) in a 3D space, based on the extracted feature point.

In a comparative example, the AR glasses 200 may perform calibration (see 330) to calibrate gaze data by reflecting a user's eye characteristic. The AR glasses 200 may display a virtual object of which a position (coordinates) is known on a screen in a state where the user is wearing the AR glasses 200, and may identify parameters related to the user's eye characteristic while the user is looking at the virtual object. The parameter related to the eye characteristic may include a corneal curvature radius for the user and an angular difference between a visual axis and an optical axis. The visual axis may be a straight line which connects a fovea and a center of corneal curvature, and the optical axis may be a straight line which connects a pupil center and the center of corneal curvature. For example, the AR glasses 200 may calibrate gaze data estimated based on the 3D model by reflecting an angle between the visual axis and optical axis identified for the user, thereby acquiring eye data including a gaze vector, eye position, or point of gaze for the user (see 340). The acquired eye data may be utilized for interaction or stereoscopic rendering which uses the user's gaze in a process of providing AR content through the AR glasses 200.

Figure 6:
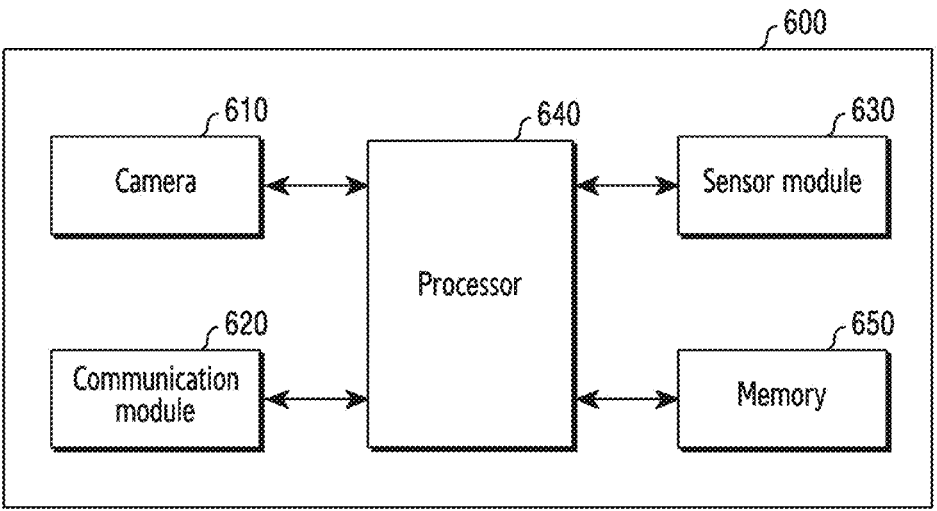
FIG. 6 illustrates a structure of an electronic device according to an embodiment.

FIG. 6 illustrates a structure of an electronic device according to an embodiment.

Referring to FIG. 6, an electronic device 600 may include a camera 610, a communication module 620, a sensor module 630, at least one processor 640, or a memory 650, as a device for performing eye tracking by applying a feature extraction method dynamically selected in consideration of an external environment or a user characteristic. According to various embodiments, the electronic device 600 may be a user wearable device type such as AR glasses or Head Mounted Device (HMD) devices, or may be a mobile terminal type such as smartphones or tablets. In FIG. 6, the electronic device 600 may correspond to the electronic device 101 of FIG. 1.

In an embodiment, the camera 610 (e.g., the camera module 180 of FIG. 1) may capture an eye image including a user's left eye and/or right eye. For example, the camera 610 disposed to one side of the electronic device 600 may capture both eyes at the same time. As another example, the camera 610 may include two or more cameras disposed towards different directions, and may acquire each of images of the left and right eyes captured by the two or more cameras disposed towards the left eye and/or the right eye. According to various embodiments, the camera 610 may include an IR camera which produces an image by using light of an IR wavelength.

In an embodiment, the communication module 620 (e.g., the communication module 190 of FIG. 1) may support a communication connection with one or more external devices. For example, the communication module 620 may establish a connection with external devices (e.g., AR glasses or HMD devices) located within a specific distance by using short-range communication such as Bluetooth, Wi-Fi direct, Bluetooth Low Energy (BLE) or Ultra-Wide Band (UWB) communication. As another example, the communication module 620 may transmit/receive data required to analyze an eye image while connected wiredly to the external device.

In an embodiment, the sensor module 630 (e.g., the sensor module 176 of FIG. 1) may include one or more sensors for collecting/measuring information on an external environment or user's biometric information. For example, the sensor module 630 may include an illumination sensor for measuring illumination around a user. As another example, the sensor module 630 may include an ElectroOculoGram (EOG) sensor for detecting a user's eye movement. In addition, various types of sensors for detecting a change in an environmental characteristic of the user or around the user may be included in the sensor module 630.

In an embodiment, the memory 650 (e.g., the memory 130 of FIG. 1) may store instructions which control, when executed, the at least one processor 640 (e.g., the processor 120 of FIG. 1) to perform a variety of operations. For example, the at least one processor 640 may perform operations for identifying a pupil position from an eye image. The operations include, for example, performing a first pupil position identification operation using a first feature point extraction scheme, or performing a second pupil position identification operation using a second feature point extraction scheme.

In an embodiment, the at least one processor 640 may acquire a first image including a user's left eye and/or right eye. The first image may be an image captured by an IR camera. For example, when the electronic device 600 is a user wearable device type, the at least one processor 640 may use the camera 610 to acquire the first image by capturing the user's left eye and/or right eye. As another example, when the electronic device 600 is a mobile terminal type, the at least one processor 640 may receive the first image from an external device (e.g., AR glasses or HMD devices) coupled through the communication module 620.

In an embodiment, the at least one processor 640 may measure a characteristic value related to a user's eye or an environment around the user by using one or more sensors included in the sensor module 630 while acquiring the first image, and may identify whether the measured characteristic value satisfies a designated condition. The designated condition is a reference value which may apply the first method in a process of identifying the pupil position from the image, and may be predefined and stored in the memory 650. For example, the characteristic value related to the user's eye may include at least one of color, edge, brightness, and saturation of an area around the user's eye. As another example, the characteristic value related to the environment around the user may include at least one of a lighting condition, illuminance, and location (e.g., indoors or outdoors) around the user.

In an embodiment, upon identifying that the measured characteristic value satisfies the designated condition, the at least one processor 640 may identify a pupil position in the first image by using the first method. The first method is a method of extracting a feature point corresponding to a pupil position, based on matching with a designated pattern (e.g., an elliptical shape), and may correspond to the classic method described in FIG. 4. When it is determined to use the first method, the at least one processor 640 may detect edges in the first image, and may perform ellipse fitting on the detected edges to extract the feature point corresponding to the pupil position.

In an embodiment, upon identifying that the measured characteristic value does not satisfy the designated condition, the at least one processor 640 may identify the pupil position in the first image by using the second method. The second method is a method of extracting the feature point corresponding to the pupil position, based on a trained network, and may correspond to the deep learning method described in FIG. 5. When it is determined to use the second method, the at least one processor 640 may segment the first image on a pixel basis, and may detect a pupil pattern from the segmented pixels by using a trained neural network model to extract the feature point corresponding to the pupil position.

In an embodiment, the at least one processor 640 may acquire a second image subsequent to the first image while it is configured to perform feature extraction using the first method. For example, when the electronic device 600 is a user wearable device type, the at least one processor 640 may use the camera 610 to acquire the second image by capturing the user's left eye and/or right eye. As another example, when the electronic device 600 is a mobile terminal type, the at least one processor 640 may receive the second image from an external device (e.g., AR glasses or HMD devices) coupled through the communication module 620. The second image is an image captured from the same portion as the first image with a time interval, and may be an image captured by an IR camera.

In an embodiment, the at least one processor 640 may determine an amount of change in the second image with reference to the first image, and may determine whether the identified amount of change in the second image is greater than or equal to a designated level. The at least one processor 640 may identify whether there has been a change in the external environment or the user at the time of acquiring the second image. For example, the at least one processor 640 may detect a change in an illumination value measured while acquiring the second image or a lighting environment, based on a pupil size included in the second image. For example, the at least one processor 640 may determine that the amount of change in the second image is greater than or equal to the designated level, upon detecting that the illumination value measured while acquiring the second image decreases to be less than a designated value or upon identifying that the pupil size increases by at least a designated ratio, compared to the first image, through analysis of the second image. As another example, the at least one processor 640 may may detect a change of the user by analyzing a color or edge characteristic of an eye area included in the second image. The at least one processor 640 may determine that the amount of change in the second image is greater than or equal to the designated level, upon identifying that the color or edge characteristic of the eye area included in the second image changes by at least the designated level.

In an embodiment, upon identifying that the amount of change in the second image is greater than or equal to the designated level, the at least one processor 640 may calculate accuracy of the first method. For example, the at least one processor 640 may compare a result of detecting the pupil of the second image by using the first method with a result of detecting the pupil by using the second method, and may identify the accuracy of the first method, based on a degree to which the detection results based on the two methods match. The degree to which the detection results match may be identified based on a mean Intersection Over Union (mIOU) calculated for the pupil detection result based on the first method and the pupil detection result based on the second method. As another example, the at least one processor 640 may calculate the accuracy of the first method according to a detection result using an Electrooculography (EOG) sensor included in the sensor module 630. The at least one processor 640 may compare a pupil position of the second image detected using the first method with a pupil position determined by the EOG sensor, and may identify the accuracy of the first method by quantifying a result of comparison. As another example, the at least one processor

640 may measure parameters such as an ellipse aspect ratio of a pupil estimated for the second image by using the first method or a relative angular spread of an edge point and an ellipse, and may identify the accuracy of the first method, based on these parameters.

In an embodiment, the at least one processor 640 may calculate and update the accuracy of the first method, whenever the change in the external environment or the user is detected while providing content to the user. According to various embodiments, the at least one processor 640 may store the accuracy of the first method, calculated for each situation based on a different external environment characteristic or a different user characteristic, in a memory (e.g., the memory 650 of FIG. 6), and may load and use data corresponding to a current situation from the memory 650.

In an embodiment, the at least one processor 640 may identify the pupil position by using the second method and/or by utilizing the EOG sensor, while calculating or updating the accuracy of the first method.

In an embodiment, the at least one processor 640 may identify the pupil position in the second image by dynamically selecting the first method or the second method, based on the calculated accuracy of the first method. Upon identifying that the accuracy of the first method is greater than or equal to a designated threshold, the at least one processor 640 may identify the pupil position of the second image by continuously using the first method without having to change the feature extraction method. Upon identifying that the accuracy of the first method is less than the threshold, the at least one processor 640 may identify the pupil position in the second image by changing the feature extraction method to the second method. Accordingly, the at least one processor 640 may maintain the accuracy in such a manner that the pupil position is identified by using the first method which has a small computational amount, while allowing to use the second method only in some situations where the accuracy of the first method decreases.

According to various embodiments, the at least one processor 640 may selectively apply the first method or the second method in accordance with a requirement of a running application or a user's movement status. For example, the at least one processor 640 may extract a feature point corresponding to a pupil position by using the second method while running an application requiring an eye tracking result of high accuracy. As another example, the at least one processor 640 may extract the feature point corresponding to the pupil position by using the first method, since an eye tracking function does not need to have high accuracy when the user is exercising.

Figure 7:
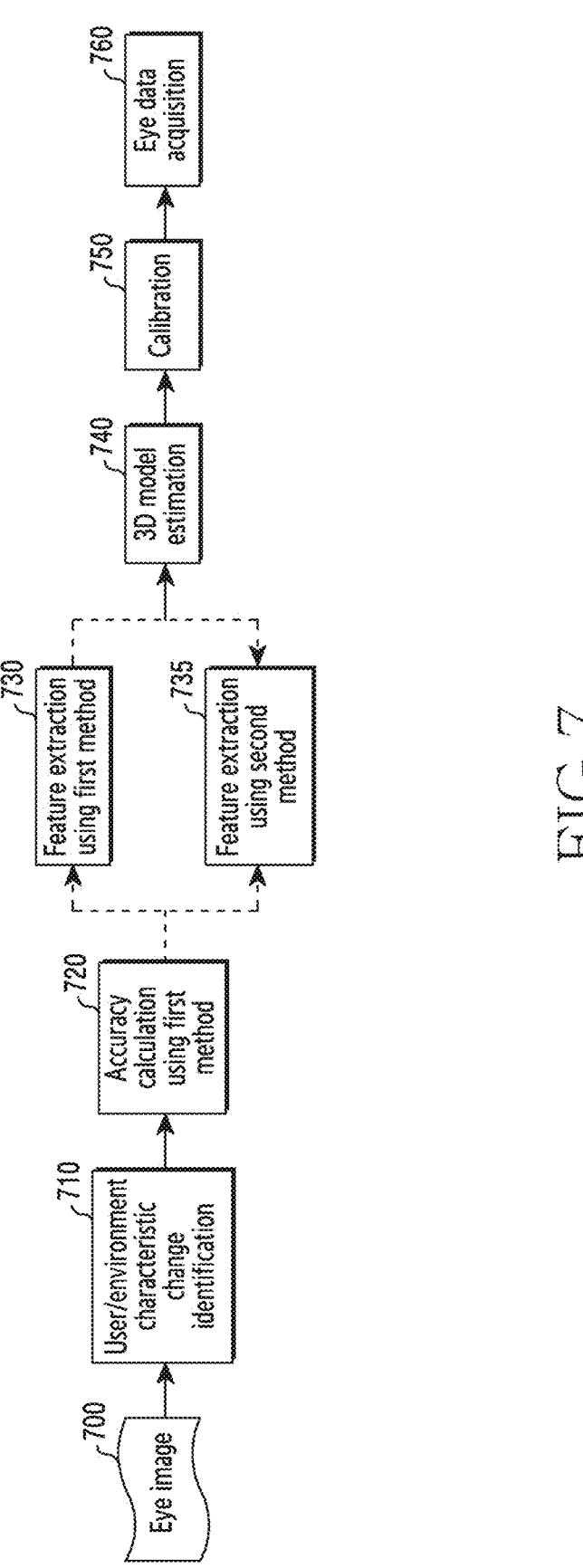
FIG. 7 illustrates an enhanced eye tracking algorithm, according to an embodiment.

FIG. 7 illustrates an enhanced eye tracking algorithm, according to an embodiment. According to various embodiments, the electronic device 600 may perform eye tracking, based on an image including at least one of user's left and right eyes.

Referring to FIG. 7, the electronic device 600 may use a camera (e.g., the camera 610 of FIG. 6) to acquire an eye image 700 by capturing user's left eye and/or right eye, or may acquire an eye image from an external device (e.g., AR glasses or HMD devices) coupled for communication with the electronic device 600. For example, the eye image 700 may be an image captured by an IR camera.

In an embodiment, the electronic device 600 may identify a change in a user/environment characteristic while providing content (see 710). The electronic device 600 may identify the change in the user/environment characteristic by analyzing images or surrounding environment data measured by a sensor (e.g., the sensor module 630 of FIG. 6)

while it is configured to perform eye tracking by using the first method. For example, the electronic device 600 may identify that there is a change in a surrounding environment characteristic upon detecting that there is a change in a lighting environment around a user, based on an illumination value measured by an illumination sensor, or upon detecting that a pupil size is increased or decreased by more than a designated ratio, compared to a previous image. As another example, the electronic device 600 may identify that there is a change in a user characteristic such as a status of wearing glasses/lenses, eye makeup, or eye disease, upon detecting a change in a color or edge characteristic of an eye area, compared to the previous image. As another example, the electronic device 600 may identify that there is a change in an environment characteristic around the user (e.g., a change in a lighting environment or illumination around the user, or a user's location movement), based on a shape or brightness.

In an embodiment, the electronic device 600 may calculate the accuracy of the first method (see 720), in response to the change in the user/environment characteristic. The first method is a method of extracting a feature point corresponding to a pupil position, based on matching with a designated pattern (e.g., an elliptical shape), and may correspond to the classic method described in FIG. 4. The electronic device 600 may identify the accuracy of the first method by matching a pupil detection result based on the first method with a measurement result using an EOG sensor or a pupil detection result based on the second method. The second method is a method of extracting the feature point corresponding to the pupil position, based on a trained network, and may correspond to the deep learning method described in FIG. 5. In addition to the second method, the electronic device 600 may identify the accuracy of the first method, based on a detection result of a feature extraction method having higher accuracy than the first method. According to various embodiments, the electronic device 600 may identify the accuracy of the first method, based on reliability of parameters such as an ellipse aspect ratio of the pupil estimated by using the first method or a relative angular spread of an edge point and an ellipse.

In an embodiment, the electronic device 600 may extract a feature point from the eye image 700 by dynamically selecting the first method or the second method according to the calculated accuracy of the first method. For example, upon identifying that the accuracy of the first method is greater than or equal to a designated threshold, the electronic device 600 may identify a pupil position in the eye image 700 by using the pre-set first method (see 730), without having to change the feature extraction method. As another example, upon identifying that the accuracy of the first method is less than the designated threshold, the electronic device 600 may identify the pupil position in the eye image 700 by changing the feature extraction method to the second method (see 735).

In an embodiment, the electronic device 600 may perform 3D model estimation (see 740) which estimates parameters of a 3D eye model by using a feature point corresponding to a pupil position extracted from the eye image 700. The electronic device 600 may estimate an eye position, a point of gaze, or a viewing angle by modeling a user's eye (or pupil) in a 3D space, based on the extracted feature point.

In a comparative example, the electronic device 600 may perform calibration (see 750) which calibrates gaze data by reflecting a user's eye characteristic. While displaying a virtual object of which a position (coordinates) is known on a screen, the electronic device 600 may may identify parameters related to the eye characteristic of the user looking at the virtual object. The parameter related to the eye characteristic may include a corneal curvature radius for the user and an angular difference between a visual axis and an optical axis. The visual axis may be a straight line which connects a fovea and a center of corneal curvature, and the optical axis may be a straight line which connects a pupil center and the center of corneal curvature. The electronic device 600 may calibrate gaze data estimated based on the 3D model by reflecting an angle between the visual axis and optical axis identified for the user, thereby acquiring eye data including a gaze vector, eye position, or point of gaze for the user (see 760).

According to the improved eye tracking algorithm described in FIG. 7, the electronic device 600 may dynamically select a feature extraction method in consideration of an external environment or a user characteristic, which may reduce a computational amount and power consumption of a processor while maintaining accuracy even in a situation where variables occur for the external environment or the user.

Figure 8:
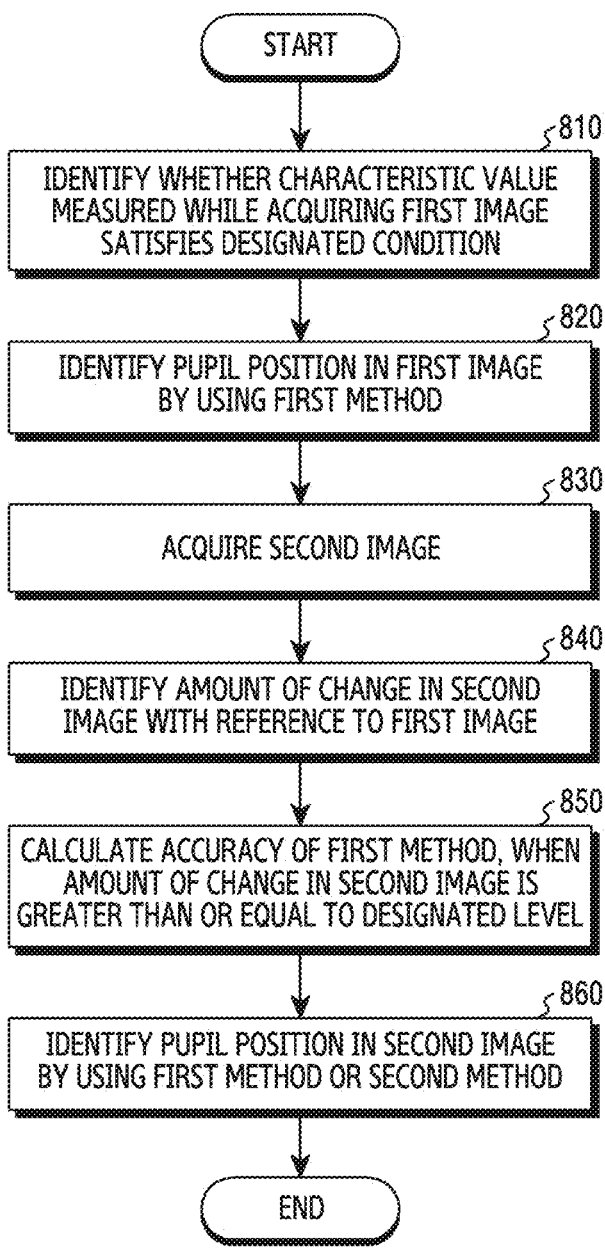
FIG. 8 is a flowchart illustrating a method of operating an electronic device, according to an embodiment.

FIG. 8 is a flowchart illustrating a method of operating the electronic device 600, according to an embodiment. According to an embodiment, the electronic device 600 may correspond to the electronic device 101 of FIG. 1, as a device for performing eye tracking by applying a feature extraction method dynamically selected in consideration of an external environment or a user characteristic. Operations of FIG. 8 may be performed by at least one processor (e.g., the processor 120 of FIG. 1 or at least one processor 640 of FIG. 6) included in the electronic device 600.

According to various embodiments, the electronic device 600 may be a user wearable device type such as AR glasses or HMD devices, or may be a mobile terminal type such as smartphones or tablets. When the electronic device 600 is a device type wearable on a user's face or head portion, the electronic device 600 may use one or more cameras (e.g., the camera 610 of FIG. 6) to acquire an eye image by capturing a user's left eye and/or right eye. When the electronic device 600 is a mobile type terminal, the electronic device 600 may acquire the eye image from an external device (e.g., AR glasses or HMD devices) coupled wirelessly or wiredly through a communication module (e.g., the communication module 620 of FIG. 6).

Referring to FIG. 8, in operation 810, the electronic device 600 may identify whether a characteristic value measured by a sensor module (e.g., the sensor module 630 of FIG. 6) while acquiring a first image including a user's eye satisfies a designated condition. The electronic device 600 may measure a characteristic value related to a user's eye or an environment around a user by using one or more sensors included in the sensor module 630 while acquiring the first image, and may identify whether the measured characteristic value satisfies the designated condition. The designated condition is a reference value which may apply the first method in a process of identifying a pupil position from the image, and may be predefined and stored in a memory (e.g., the memory 650 of FIG. 6). The characteristic value related to the user's eye may include at least one of color, edge, brightness, and saturation of an area around the user's eye, and the characteristic value related to the environment around the user may include at least one of a lighting condition, illuminance, and location (e.g., indoors or outdoors) around the user. In operation 810, the electronic device 600 may determine to select the first method when the measured characteristic value satisfies the designated condition, and to select the second method when the measured characteristic value does not satisfy the designated condition. The first method is a method of extracting a feature point corresponding to a pupil position, based on matching with a designated pattern (e.g., an elliptical shape), and may correspond to the classic method described in FIG. 4. The second method is a method of extracting the feature point corresponding to the pupil position, based on a trained network, and may correspond to the deep learning method described in FIG. 5. According to various embodiments, in addition to the first method and second method mentioned in the disclosure, the electronic device 600 may selectively apply various models optimized for a specific environment or user.

According to an embodiment, in operation 820, the electronic device 600 may identify that the measured characteristic value satisfies the designated condition, and may identify a pupil position in the first image by using the first method. For example, in operation 820, the electronic device 600 may detect edges in the first image, and may perform ellipse fitting on the detected edges to extract a feature point corresponding to the pupil position. According to various embodiments, when the measured characteristic value does not satisfy the designed condition, the electronic device 600 may identify the pupil position in the first image by using the second method. In this case, the electronic device 600 may segment the first image on a pixel basis, and may detect a pupil pattern from the segmented pixels by using a trained neural network model to extract the feature point corresponding to the pupil position.

According to an embodiment, in operation 830, the electronic device 600 may acquire a second image subsequent to the first image. The second image may be an image captured from the same portion as the first image with a time interval. For example, when the electronic device 600 is a user wearable device type, the electronic device 600 may use the camera 610 to acquire the second image by capturing the user's left eye and/or right eye. As another example, when the electronic device 600 is a mobile terminal type, the electronic device 600 may receive the second image from an external device (e.g., AR glasses or HMD devices) coupled for communication.

According to an embodiment, in operation 840, the electronic device 600 may identify an amount of change in the second image with reference to the first image, and may determine whether the identified amount of change in the second image is greater than or equal to a designated level. In operation 840, the electronic device 600 may identify whether there has been a change in the external environment or the user at the time of acquiring the second image. For example, the electronic device 600 may detect a change in an illumination value measured while acquiring the second image or a lighting environment, based on a pupil size included in the second image. The electronic device 600 may determine that the amount of change in the second image is greater than or equal to the designated level, upon detecting that the illumination value measured while acquiring the second image decreases to be less than a designated value or upon identifying that the pupil size increases by at least a designated ratio, compared to the first image, through analysis of the second image. As another example, the electronic device 600 may detect a change of the user by analyzing a color or edge characteristic of an eye area included in the second image. The electronic device 600 may determine that the amount of change in the second image is greater than or equal to the designated level, upon identifying that the color or edge characteristic of the eye area included in the second image changes by at least the designated level.

According to an embodiment, in operation 850, the electronic device 600 may identify that the amount of change in the second image is greater than or equal to the designated level, and may calculate accuracy of the first method. For example, the electronic device 600 may compare a result of detecting the pupil of the second image by using the first method with a result of detecting the pupil by using the second method, and may identify the accuracy of the first method, based on a degree to which the detection results based on the two methods match. The degree to which the detection results match may be identified based on a mean Intersection Over Union (mIOU) calculated for the pupil detection result based on the first method and the pupil detection result based on the second method. As another example, the electronic device 600 may calculate the accuracy of the first method according to a detection result using an Electrooculography (EOG) sensor included in the sensor module 630. The electronic device 600 may compare a pupil position of the second image detected using the first method with a pupil position determined by the EOG sensor, and may identify the accuracy of the first method by quantifying a result of comparison. As another example, the electronic device 600 may measure parameters such as an ellipse aspect ratio of a pupil estimated for the second image by using the first method or a relative angular spread of an edge point and an ellipse, and may identify the accuracy of the first method, based on these parameters.

According to various embodiments, the electronic device 600 may calculate and update the accuracy of the first method, whenever the change in the external environment or the user is detected while providing content to the user. The electronic device 600 may store the accuracy of the first method, calculated for each situation based on a different external environment characteristic or a different user characteristic, in a memory (e.g., the memory 650 of FIG. 6), and may load and use data corresponding to a current situation from the memory 650.

According to an embodiment, in operation 860, the electronic device 600 may identify the pupil position in the second image by dynamically selecting the first method or the second method, based on a result of calculating the accuracy of the first method. For example, upon identifying that the accuracy of the first method is greater than or equal to a designated threshold, the electronic device 600 may identify the pupil position of the second image by continuously using the first method without having to change the feature extraction method in operation 860. As another example, upon identifying that the accuracy of the first method is less than the designated threshold, the electronic device 600 may identify the pupil position in the second image by changing the feature extraction method to the second method in operation 860. Accordingly, the electronic device 600 may maintain the accuracy in such a manner that the pupil position is identified by using the first method which has a small computational amount, while allowing to use the second method only in some situations where the accuracy of the first method decreases.

According to various embodiments, the electronic device 600 may identify the pupil position by using the second method and/or by utilizing the EOG sensor, while calculating or updating the accuracy of the first method.

An electronic device (e.g., the electronic device 300) according to an embodiment may include a sensor module (e.g., the sensor module 630) including one or more sensors, at least one processor (e.g., the processor 640) operatively coupled to the sensor module, and a memory (e.g., the memory 650) operatively coupled to the at least one processor. The memory may store instructions causing, when executed, the at least one processor to identify whether a characteristic value measured from the one or more sensors while acquiring a first image including a user's eye satisfies a designated condition, when the characteristic value satisfies the designated condition, identify a pupil position in the first image by using a first scheme of extracting a feature point (e.g., a first feature point extraction scheme), based on matching with a designated pattern, acquire a second image including the user's eye, identify an amount of change in the second image with reference to the first image, when the amount of change in the second image is greater than or equal to a designated level, calculate accuracy of the first scheme, and according to the calculated accuracy, identify a pupil position in the second image by using the first scheme, or a second scheme of extracting a feature point (e.g., a second feature point extraction scheme) based on a trained network.

In an embodiment, the instructions may cause the at least one processor to, when the characteristic value does not satisfy the designated condition, identify the pupil position in the first image by using the second scheme.

In an embodiment, the electronic device may further include one or more cameras (e.g., the camera 610). The instructions may cause the at least one processor to acquire the first image and/or second image captured by using the one or more cameras.

In an embodiment, the electronic device may further include a communication module (e.g., the communication module 620) which supports a communication connection with one or more external devices. The instructions may cause the at least one processor to acquire the first image and/or second image captured from the one or more external devices by using the communication module.

In an embodiment, the instructions may cause the at least one processor to, when an illumination value measured from the one or more sensors while acquiring the second image is less than a designated value, determine that an amount of change in the second image is greater than or equal to the designated level.

In an embodiment, the instructions may cause the at least one processor to analyze a color and/or edge characteristic of an eye area included in the second image, and when the analysis result identifies that the color or edge characteristic of the eye area changes by more than the designated level, determine that the amount of change in the second image is greater than or equal to the designated level.

In an embodiment, the instructions may cause the at least one processor to compare a result of detecting a pupil of the second image by using the first image with a result of detecting the pupil of the second image by using the second scheme, and calculate accuracy of the first scheme, based on the comparison result.

In an embodiment, the instructions may cause the at least one processor to detect a pupil position in the second image by using an ElectroOculoGram (EOG) sensor included in the sensor module, and calculate accuracy of the first scheme by matching a result of detecting a pupil of the second image by using the first scheme with a result of detecting the pupil by using the EOG sensor.

In an embodiment, the instructions may cause the at least one processor to, when the calculated accuracy of the first scheme is greater than or equal to a threshold, identify a pupil position in the second image by using the first scheme.

In an embodiment, the instructions may cause the at least one processor to, when the calculated accuracy of the first scheme is less than the threshold, identify the pupil position in the second image by using the second scheme.

A method of operating an electronic device (e.g., the electronic device 600) according to an embodiment may include identifying whether a characteristic value measured from one or more sensors while acquiring a first image including a user's eye satisfies a designated condition, when the characteristic value satisfies the designated condition, identifying a pupil position in the first image by using a first scheme of extracting a feature point, based on matching with a designated pattern, acquiring a second image including the user's eye, identifying an amount of change in the second image with reference to the first image, when the amount of change in the second image is greater than or equal to a designated level, calculating accuracy of the first scheme, and according to the calculated accuracy, identifying a pupil position in the second image by using the first scheme or a second scheme of extracting a feature point, based on a trained network.

In an embodiment, the method may further include, when the characteristic value does not satisfy the designated condition, identifying the pupil position in the first image by using the second scheme.

In an embodiment, the first image and/or the second image may be obtained using one or more cameras (e.g., the camera 610) included in the electronic device.

In an embodiment, the first image and/or the second image may be obtained from one or more external devices coupled using a communication circuit (e.g., the communication module 620) included in the electronic device.

In an embodiment, the identifying of the amount of change in the second image may include, when an illumination value measured from the one or more sensors while acquiring the second image is less than a designated value, determining that an amount of change in the second image is greater than or equal to the designated level.

In an embodiment, the identifying of the amount of change in the second image may include analyzing a color and/or edge characteristic of an eye area included in the second image, and when the analysis result identifies that the color or edge characteristic of the eye area changes by more than the designated level, determining that the amount of change in the second image is greater than or equal to the designated level.

In an embodiment, the calculating of the accuracy of the first scheme may include comparing a result of detecting a pupil of the second image by using the first scheme with a result of detecting the pupil of the second image by using the second scheme, and calculating accuracy of the first scheme, based on the comparison result.

In an embodiment, the calculating of the accuracy of the first scheme may include detecting a pupil position in the second image by using an EOG sensor, and calculating accuracy of the first scheme by matching a result of detecting a pupil of the second image by using the first scheme with a result of detecting the pupil by using the EOG sensor.

In an embodiment, the identifying of the pupil position in the second image may include, when the calculated accuracy of the first scheme is greater than or equal to a threshold, identifying a pupil position in the second image by using the first scheme.

In an embodiment, the identifying of the pupil position in the second image may include, when the calculated accuracy of the first scheme is less than the threshold, identifying the pupil position in the second image by using the second scheme.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:

a sensor module including one or more sensors;

at least one processor; and memory storing instructions that, when executed by the at least one processor, cause the electronic device to:

identify whether a characteristic value of a lighting environment measured from the one or more sensors while acquiring a first image including a user's eye satisfies a designated condition, wherein the designated condition includes an illuminance threshold value for applying a first scheme of extracting a feature point based on edge detection;

when the characteristic value satisfies the designated condition, identify a pupil position in the first image by using the first scheme;

acquire a second image including the user's eye;

determine whether at least one of brightness, color or edge characteristics in the second image is changed from the first image based on a comparison between the first image and the second image;

when the at least one of brightness, color or edge characteristics in the second image is changed from the first image, calculate an accuracy of the first scheme based on an ellipse-related parameter estimated using the first scheme;

when the accuracy of pupil detection by the first scheme is greater than or equal to a threshold, identify a pupil position in the second image by using the first scheme; and when the accuracy of pupil detection by the first scheme is less than the threshold, identify the pupil position in the second image by using a second scheme of extracting a feature point based on a trained artificial intelligence (AI) model.

2. The electronic device of claim 1, wherein the instructions, when executed by the at least one processor, cause the electronic device to, when the characteristic value does not satisfy the designated condition, identify the pupil position in the first image by using the second scheme.

3. The electronic device of claim 1, further comprising: one or more cameras; and a communication module which supports a communication connection with one or more external devices;

wherein the instructions, when executed by the at least one processor, cause the electronic device to acquire at least one of the first image or second image captured by using the one or more cameras, or acquire at least one of the first image or the second image captured from the one or more external devices by using the communication module.

4. The electronic device of claim 1, wherein the instructions, when executed by the at least one processor, cause the electronic device to, when an illumination value measured from the one or more sensors while acquiring the second image is less than the illuminance threshold value, determine that the brightness in the second image is changed.

5. The electronic device of claim 1, wherein the instructions, when executed by the at least one processor, cause the electronic device to:

perform an analysis of at least one of a color or edge characteristics of an eye area included in the second image; and determine whether the at least one of the color or the edge characteristics in the second image is changed from the first image based on a result of the analysis.

6. The electronic device of claim 1, wherein the instructions, when executed by the at least one processor, cause the electronic device to:

compare a result of detecting a pupil of the second image by using the first scheme with a result of detecting the pupil of the second image by using the second scheme; and calculate the accuracy of pupil detection by the first scheme, based on the comparison result.

7. The electronic device of claim 1, wherein the instructions, when executed by the at least one processor, cause the electronic device to:

detect the pupil position in the second image by using an ElectroOculoGram (EOG) sensor included in the sensor module; and calculate the accuracy of pupil detection by the first scheme based on matching a result of detecting the pupil of the second image by using the first scheme with a result of detecting the pupil by using the EOG sensor.

8. A method comprising:

identifying whether a characteristic value of a lighting environment measured from one or more sensors while acquiring a first image including a user's eye satisfies a designated condition, wherein the designated condition includes an illuminance threshold value for applying a first scheme of extracting a feature point based on edge detection;

when the characteristic value satisfies the designated condition, identifying a pupil position in the first image by using the first scheme;

acquiring a second image including the user's eye;

determining whether at least one of brightness, color or edge characteristics in the second image is changed from the first image based on a comparison between the first image and the second image;

when the at least one of brightness, color or edge characteristics in the second image is changed from the first image, calculating an accuracy of the first scheme based on an ellipse-related parameter estimated using the first scheme;

when the accuracy of pupil detection by the first scheme is greater than or equal to a threshold, identifying a pupil position in the second image by using the first scheme; and when the accuracy of pupil detection by the first scheme is less than the threshold, identifying the pupil position in the second image by using a second scheme of extracting a feature point based on a trained artificial intelligence (AI) model.

9. The method of claim 8, further comprising, when the characteristic value does not satisfy the designated condition, identifying the pupil position in the first image by using the second scheme.

10. The method of claim 8, wherein at least one of the first image or the second image are obtained using one or more cameras included in the electronic device, or are obtained from one or more external devices coupled using a communication circuit included in the electronic device.

11. The method of claim 8, wherein the determining whether at least one of brightness, color or edge characteristics in the second image is changed from the first image comprises:

when an illumination value measured from the one or more sensors while acquiring the second image is less than the illuminance threshold value, determining that the brightness in the second image is changed;

performing an analysis of at least one of a color or edge characteristics of an eye area included in the second image; and determining whether the at least one of the color or the edge characteristics in the second image is changed from the first image based on a result of the analysis.

12. The method of claim 8, wherein the calculating of the accuracy of pupil detection by the first scheme comprises:

comparing a result of detecting a pupil of the second image by using the first scheme with a result of detecting the pupil of the second image by using the second scheme; and calculating the accuracy of pupil detection by the first scheme, based on the comparison result.

13. The method of claim 8, wherein the calculating the accuracy of pupil detection by the first scheme comprises:

detecting the pupil position in the second image by using an electrooculogram (EOG) sensor; and calculating the accuracy of pupil detection by the first scheme based on matching a result of detecting a pupil of the second image by using the first scheme with a result of detecting the pupil by using the EOG sensor.

14. An electronic device comprising:

a sensor;

a processor in signal communication with the sensor, the processor including a memory that stores instructions causing, when executed, the processor to:

to acquire an image of an eye existing in a surrounding environment from the sensor;

to perform a first feature point extraction scheme to extract a feature point from the image of the eye and determine an accuracy of the first feature point extraction scheme;

to select a first pupil position identification operation to identify a pupil position of the eye in response to the accuracy of the first feature point extraction scheme being greater than or equal to a designated threshold; and to select a second pupil position identification operation to identify the pupil position of the eye in response to the accuracy of the first feature point extraction scheme being less than the designated threshold.

15. The electronic device of claim 14, wherein the first pupil position operation identifies the pupil position based on the first feature point extraction scheme which uses designated pattern matching, and the second pupil position operation identifies the pupil position based on a second feature point extraction scheme which uses a trained neural network model.

16. The electronic device of claim 15, wherein the first feature point extraction scheme includes detecting edges of the eye in the image and performing ellipse fitting for the detected edges, and the second feature point extraction scheme includes segmenting the image of the eye on a pixel basis to generate segmented pixels and detecting a pupil pattern from the segmented pixels using the trained neural network.

17. The electronic device of claim 14, where the processor identifies a change in one or both of an eye characteristic of the eye and an environment characteristic of the surrounding environment, and determines the accuracy of the first feature point extraction scheme based on the change in one or both of the eye characteristic of the eye and the environment characteristic of the surrounding environment.

\* \* \* \* \*